March 19, 1929.　　C. BALZI ET AL　　1,705,602
SHAPING MACHINE
Filed Feb. 11, 1928
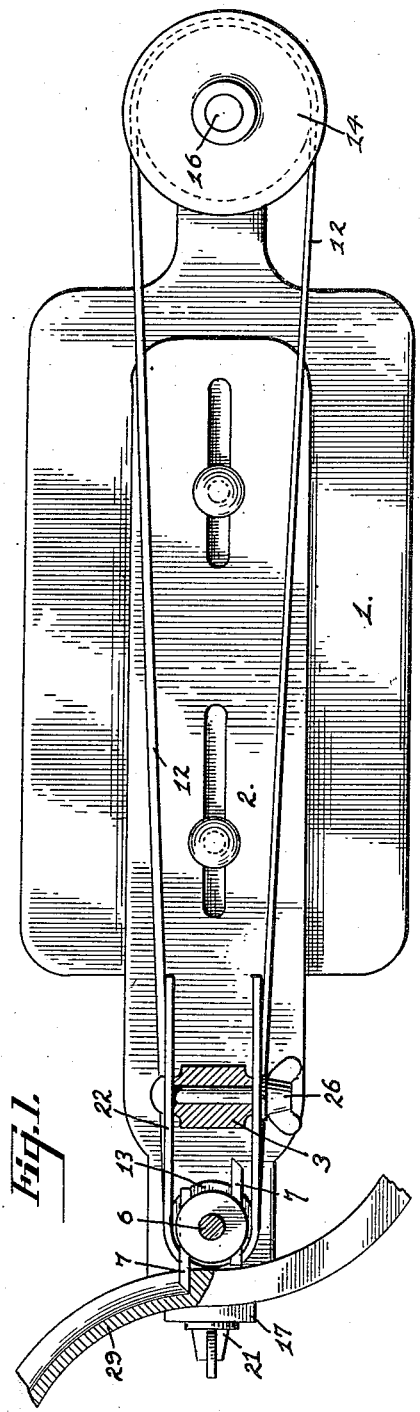
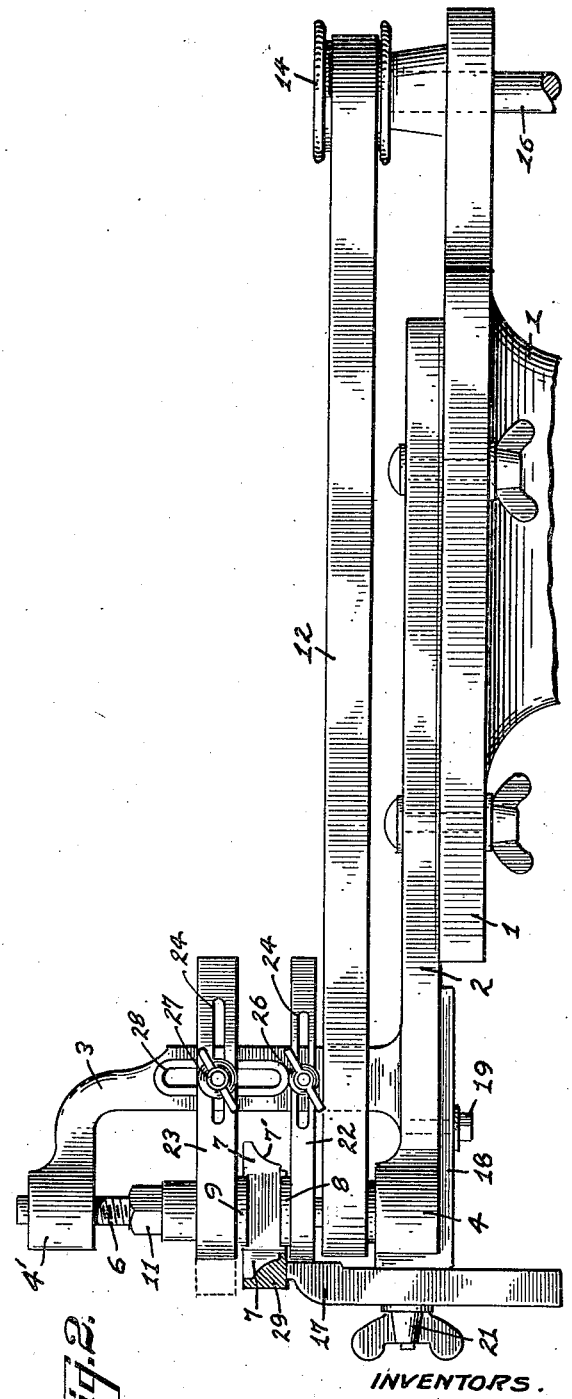
INVENTORS.
CLEMENTE BALZI.
PAUL JURAVCOFF
By Arthur L. Slee
ATTY.

Patented Mar. 19, 1929.

1,705,602

UNITED STATES PATENT OFFICE.

CLEMENTE BALZI AND PAUL JURAVCOFF, OF SAN FRANCISCO, CALIFORNIA.

SHAPING MACHINE.

Application filed February 11, 1928. Serial No. 253,648.

Our invention relates to improvements in shaping machines wherein a rotary cutter is mounted in an exposed accessible position and arranged to cut irregular pieces of material presented manually to the cutter at various angles.

The primary object of our invention is to provide an improved shaping machine for manual use in shaping irregular pieces of material.

Another object is to provide an improved machine wherein the cutter is accessible for presenting material at various angles to the cutter.

A further object is to provide an improved machine wherein the shaper head overhangs the supporting base to facilitate the manipulation of material against the cutter.

Another object is to provide a machine of the character described which may be easily adjusted for different forms of cutters and for holding various shapes of material in operative relation to the cutter.

A further object is to provide an improved machine wherein adjustable guards are arranged to be adjusted relative to the cutter to protect workmen operating the machine.

A still further object is to provide a machine of simple and rugged construction which can be constructed and operated with high efficiency.

We accomplish these and other objects by means of the improved device disclosed in the drawings forming a part of the present application wherein like characters of reference are used to designate similar parts throughout the specification and drawings, and in which—

Fig. 1 is a plan view of our improved shaping machine; and

Fig. 2 is a broken side elevation of the machine.

Referring to the drawings, the numeral 1 is used to designate in general a supporting base upon which is mounted a shaper head consisting of a body portion 2 adjustably supported upon the top of the base 1 and overhanging the front thereof. A yoke 3 is formed upon the overhanging end of the body 2, said yoke being provided with bearing portions 4 and 4' arranged to receive a spindle 6 rotatably mounted therein.

A rotating cutter is mounted upon the spindle 6, said cutter comprising a pair of cutter blades 7 detachably mounted between a fixed chuck jaw 8 secured upon the spindle, and a movable chuck jaw 9, said movable chuck being arranged to be moved into clamping relation to the blades 7 by means of a nut 11 threaded onto the spindle 6. The spindle and cutter are arranged to be rotated by means of a belt 12 mounted over a pulley 13 mounted upon the spindle 6 and a drive pulley 14 mounted upon a drive shaft 16 mounted upon the base 1 and driven by any suitable source of power, not shown.

A guide 17 is adjustably mounted upon an adjustable bracket 18 mounted upon the overhanging end of the body 2 of the shaper head. The bracket is engaged by a clamping screw 19 arranged to permit horizontal adjustment of the bracket, and the guide 17 is engaged by a clamping screw 21 arranged to permit vertical adjustment of the guide relative to the bracket.

A pair of guards 22 and 23 are adjustably mounted upon axially opposite sides of the cutter. The guards consist of U shaped members extending around the spindle 6 and having slots 24 formed therein to be engaged by clamping members 26 and 27 respectively. The clamping member 27 engages a slot 28 formed in the yoke portion of the head to permit the guard 23 to be adjusted axially relative to the spindle 6.

In operation, the spindle 6 is driven by the belt 12 to rotate the cutter at a suitable speed. The cutting edges 7' of the cutter blades are shaped to produce a desired form of cut, blades 7 of a suitable size and shape being selected for the particular work to be done. The guide 17 is adjusted to a position such that the material to be shaped may be supported upon the upper end of the guide in the proper relation to the cutter, the material being presented to the cutter and moved therepast with the guide serving to support and guide the material to maintain a uniform relation to the cutter. The lower guard yoke is adjusted to provide the desired clearance across the front of the cutter, said yoke extending around the sides to guard said sides and the back of the cutter. The upper guard is adjusted transversely and axially to afford the necessary clearance to permit the material to be manipulated across the front of the cutter. If the material to be cut is of greater width than the cutter blades, the yoke is set to leave the front of the cutter entirely clear, as shown in full lines in Fig. 2. If the material is narrow, the yoke is set forward as shown in dotted lines to guard the top and front of the cutter. Blades of various widths may be used by receding the nut 11 and movable chuck jaw 9 to receive and clamp the blades, the slot 28 permitting the guard 23 to be axially adjusted to accommodate cutter blades of various widths.

Our improved shaper is particularly adapted for use in shaping material of irregular form such as curved mouldings, and irregular members of various kinds. Such irregular members can be readily presented at any angle necessary to accomplish the desired shaping, and as the cutter is mounted upon the outer end of the overhanging portion of the shaper head, the member may be easily held and moved manually past the cutter without interference by other portions of the machine. Thus, in Fig. 1 of the drawings, we have illustrated a member 29 constructed in the form of an ogee curve, showing the manner in which said member is presented to the cutter. Such a member could not be manipulated upon the table of an ordinary shaper, but may be readily presented and moved past the cutter of our improved machine.

While we have illustrated and described the preferred embodiment of our invention, the device is of course subject to modification in numerous details of construction and arrangement. We therefore do not wish to restrict ourselves to the specific details disclosed, but desire to avail ourselves of all modifications which may fall within the scope of the appended claims.

Having thus described our invention what we claim as new and desire to secure by Letters Patent is—

1. A shaping machine comprising a supporting base; a shaper head mounted upon the base and overhanging the front thereof; a power driven spindle mounted upon the overhanging portion of the head; a cutter mounted upon the spindle in exposed position upon the front of the machine and arranged to cut material of irregular shape manually presented thereto; a guide mounted upon the head adjacent the cutter to guide and support material held at various angles relative to the cutter; and a pair of independently adjustable guards mounted upon axially opposite sides of the cutter.

2. A shaping machine comprising a supporting base; a shaper head mounted upon the base and overhanging the front thereof; a power driven spindle mounted upon the overhanging portion of the head; a cutter mounted upon the spindle in exposed position upon the front of the machine and arranged to cut material of irregular shape presented thereto; a guide mounted upon the head adjacent the cutter to guide and support material held at various angles relative to the cutter, said guide being horizontally and vertically adjustable relative to the cutter; and a pair of guards mounted upon axially opposite sides of the cutter, said guards being transversely adjustable relative to the cutter and spindle and one of said guards being also axially adjustable relative to the cutter and spindle.

3. A shaping machine comprising a supporting base; a shaper head mounted upon the base and overhanging the front thereof; a power driven spindle mounted upon the overhanging portion of the head; a cutter mounted upon the spindle in exposed position upon the front of the machine and arranged to cut material of irregular shape presented thereto; a guide mounted upon the head adjacent the cutter to guide and support material held at various angles relative to the cutter; and a pair of U-shaped guards adjustably mounted upon the head to extend around the spindle upon opposite sides of the cutter.

4. A shaping machine comprising a supporting base; a shaper head mounted upon the base and overhanging the front thereof; a power driven spindle mounted upon the overhanging portion of the head; a cutter mounted upon the spindle in exposed position upon the front of the machine and arranged to cut material of irregular shape presented thereto; a guide mounted upon the head adjacent the cutter to guide and support material held at various angles relative to the cutter; and a pair of U-shaped guards mounted upon the head to extend around the spindle upon opposite sides of the cutter, said guards being transversely adjustable relative to the spindle and one of said guards being also axially adjustable to accommodate cutters of various widths.

5. A shaping machine comprising a supporting base; a shaper head mounted upon the base and overhanging the front thereof; a power drive spindle mounted in vertical position upon the overhanging portion of the head; a cutter mounted upon the spindle in exposed position upon the front of the machine and arranged to cut material of irregular shape manually presented thereto; a guide mounted upon the head adjacent the cutter to guide and support material held at various angles relative to the cutter, said guide being horizontally and vertically adjustable; and a pair of U-shaped guards adjustably mounted upon the head and extending around the spindle upon opposite sides of the cutter.

In witness whereof, we hereunto set our signatures.

CLEMENTE BALZI.
PAUL JURAVCOFF.